U. J. EWING.
COMBINED WATER FILTER, STERILIZER, AND COOLER.
APPLICATION FILED OCT. 17, 1914.
1,123,117.
Patented Dec. 29, 1914.
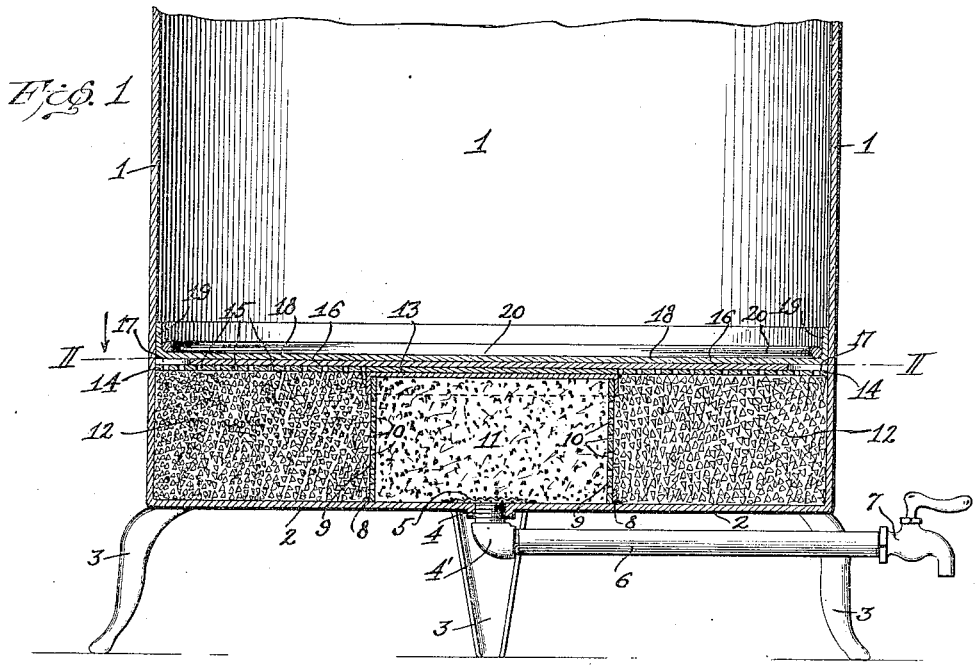
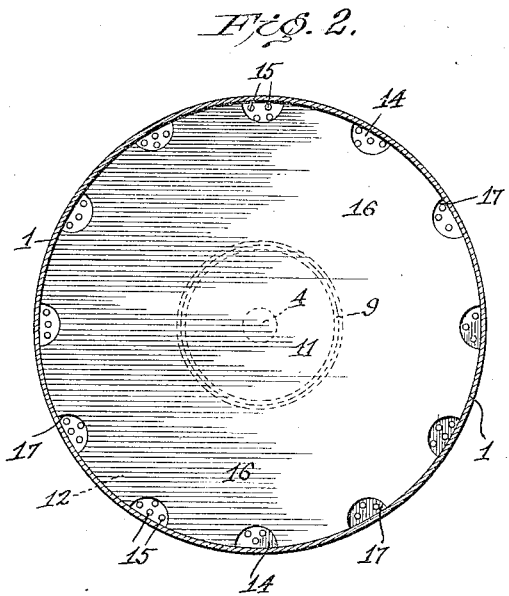
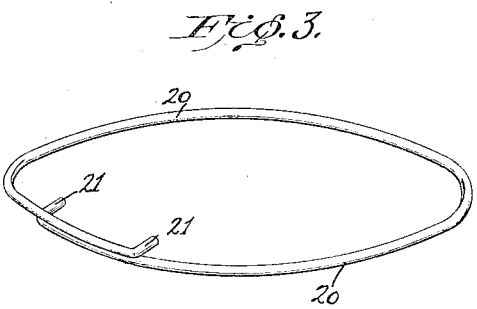

UNITED STATES PATENT OFFICE.

URBANE J. EWING, OF UNIONTOWN, PENNSYLVANIA.

COMBINED WATER FILTER, STERILIZER, AND COOLER.

1,123,117.                Specification of Letters Patent.      Patented Dec. 29, 1914.

Application filed October 17, 1914. Serial No. 867,188.

*To all whom it may concern:*

Be it known that I, URBANE J. EWING, a citizen of the United States, residing at Uniontown, in the county of Fayette and State of Pennsylvania, have invented certain new and useful Improvements in Combined Water Filters, Sterilizers, and Coolers, of which the following is a specification.

My invention relates to filters and designed more particularly for removing sediment, bacteria, and other impurities from drinking water.

The objects of my invention are first, to construct a water filter which not only is durable but cheap to manufacture, easily assembled or taken apart for cleaning and inspection and renewal of the filtering and purifying materials. Second, to construct a filter in which the parts are so constructed and arranged that all the water in the filter will readily pass out from the same, thus insuring no dead water space to pocket the contaminated water after the faucet is opened to completely drain the filter when not in use or to be taken apart for cleaning or inspection. Third, to construct a combined filter, sterilizer and cooler, in which the parts are so constructed and arranged that the water will pass through and over a maximum of filtering or softening material and in contact with a bacteria sterilizing surface within a minimum of space of the cooler, thereby insuring a large space for receiving the water to be treated within a given sized combined filter and cooler. Fourth, to construct a combined filter and sterilizer in which the parts are regular in shape, easily stamped, cut or shaped and assembled by ordinary skilled labor, in the minimum of time, thereby reducing the cost of manufacture and selling price to the lowest figure without reducing the efficiency and capacity of the filter. Fifth, other objects and advantages of the invention will readily appear from the detailed description to be hereinafter given.

The invention consists of structural features and relative arrangements of the different elements comprising the filter, which will be hereinafter more fully described and particularly pointed out in the appended claims.

In the accompanying sheet of drawing similar reference characters indicate the same parts in the several figures in which—

Figure 1 is a longitudinal sectional view partly in elevation, of the bottom of a combined filter and cooler provided with my improvements; Fig. 2 is a transverse sectional view taken on line II—II of Fig. 1, and Fig. 3 is a perspective view of the split wire ring for retaining the woven asbestos pad on top of the filter.

Referring to the drawings, 1 represents the outer cylinder or water cooler receptacle which may be made of any suitable material and provided with any suitable and well known coating or lining to prevent corrosion, and an outer well known non-conducting sheathing, not shown, to insure the outer temperature from not affecting that within the cooler.

A bottom 2 of the receptacle has secured thereto the usual legs 3, 3, and is provided preferably at its center section with a threaded opening 4, which receives an outer depending threaded nipple 4', to which is attached, by means of an elbow, a horizontal outlet pipe 6, arranged adjacent to the underside of the bottom 2, the outer end of said pipe 6 being controlled by a faucet 7.

Secured to the inner side of the bottom 2, by solder or other means and over the threaded opening 4, is a section of copper screen 5 to prevent any of the filtering material from passing into the pipe 6.

Attached to the bottom 2, by solder or held in place by engagement with a ring 8, suitably secured to said bottom 2, is a ring 9, having a series of perforations 10, said ring 9 being symmetrically placed with respect to the opening 4, in the bottom 2, and subdivides the lower section of the cylinder or receptacle 1, into a circular central compartment 11, surrounded by an annular compartment 12. The compartments 11 and partment 12 are filled with any form of granular water purifying materials such as animal or wood charcoal, or with any suitable purifying material, indicated in Fig. 1.

The upper and open end of the central compartment 11, is closed by an imperforate removable cover 13, while resting on top of said cover 13, is a circular cover 14, of a diameter equal to the inner diameter of the cylinder or receptacle 1, said cover 14, being so constructed and arranged, that the outer annular section directly over the annular compartment 12, is provided with perforations 15, while the central circular section over the cover 13 is preferably imperforate.

16 is an imperforate cover superimposed upon and being of the same diameter as the cover 14, and is provided at its periphery with a series of cut away sections 17, preferably semicircular in form as shown in Fig. 2.

Resting upon the cover 16 is an interwoven wire and asbestos circular diaphragm 18 having an upturned edge or periphery 19, lying against the inner side of the receptacle 1 and firmly held in position down on the cover 16 and against the receptacle 1, by means of a split wire ring 20, having overlapping ends provided with upturned extensions 21, to be grasped by the fingers, to retract the ring 20, to disengage the same from the inner side of the receptacle 1, and enable the asbestos cover 18, superimposed covers 14 and 16 to be removed to clean or renew the charges of charcoal or softening materials in the compartments 11 or 12. The inner side and bottom of the receptacle 1, covers 14 and 16 and ring 9, are preferably made of bright metallic copper to effect a copper sterilization of the water as it passes over the same to destroy the colon and typhoid bacilli.

The apparatus being assembled and charged as shown in Fig. 1, the water in the receptacle 1, above the asbestos diaphragm 18, percolates through the meshes of said asbestos and comes in contact with and flows outwardly on the upper side and upper surface of the cover 16, until it reaches the openings 17, 17, when said water passes downwardly and through the outer perforated periphery of the cover 14 into the filtering or purifying composition at the periphery of the outer annular compartment 12. The water after reaching the periphery of the annular compartment 12, flows horizontally and in a radial direction through the perforations 10, 10, in the ring 9, through the purifying or filtering composition within the central compartment 11, passing down and through the screen 5 into drain opening 4 and drain pipe 6, from whence it is withdrawn as desired by opening the faucet 7.

From the foregoing description of the construction, mode of assembling and operation of the invention, it will be readily seen that there is evolved a combined filter, sterilizer, and purifier, which effects all the objects and advantages set forth in the statement of the invention, and the water to be purified is made to pass in a circuitous passage through a large section of cleansing compositions and over sterilizing surfaces to efficiently kill all bacteria, bacilli, and germs contained in said water.

While I have shown the preferred form of the casing 1, and the compartments 11 and 12, as circular and annular in shape, I do not limit the invention to this particular shape, as any other may be substituted therefor without departing from the spirit of my improvements.

I wish it also to be understood that I may use any other form or kind of purifying materials than those mentioned in the foregoing part of the specification, such as sand, or silico-carbon, and while I prefer to use the sand or carbon in the annular compartment 12 and the purifying material in the central compartment 11, this distribution of said materials may be reversed without departing from my invention. Any other materials than asbestos, can be employed for the interwoven cover or diaphragm 18, if found desirable.

What I claim is:

1. A combined water purifier and sterilizer comprising a receptacle having a bottom with a drain opening in said bottom, a drain pipe outside of said receptacle and connected with said drain opening, a screen over the said opening, a perforated partition resting on the bottom of said receptacle and disposed around the opening, thereby dividing the bottom section of said receptacle in a central compartment surrounded by an outer compartment adapted to receive water purifying material, a perforated cover for the outer compartment, an imperforate cover having its outer edge provided with a series of cut out sections or notches superimposed over the top of the central compartment and the perforated cover of the outer compartment, and a woven asbestos cover superimposed and resting on said imperforate cover.

2. A combined water purifier and sterilizer comprising a receptacle having a bottom with a drain opening flush with said bottom, a drain pipe outside of said receptacle adjacent to the bottom and connected with said drain opening, a screen within the receptacle and over the said opening, a perforated annular ring or partition resting on the bottom of said receptacle and around the opening, thereby dividing the bottom section of said receptacle in a central circular compartment surrounded by an outer annular compartment adapted to receive water purifying material, a perforated cover for the outer annular compartment, an imperforate cover having its outer edge provided with a series of cut out sections or notches superimposed over the top of the central compartment and the perforated cover of the annular compartment, and a woven asbestos cover superimposed and resting on said imperforate cover.

3. A combined water purifier and sterilizer comprising a receptacle having a bottom with a drain opening flush with said bottom, a drain pipe outside of said receptacle adjacent to the bottom and connected with said drain opening, a screen within the receptacle and over the said opening, a perforated annular ring or partition resting on the bottom of said receptacle and around the opening, thereby dividing the bottom section of said receptacle in a central circular compartment surrounded by an outer annular compartment adapted to receive water purifying material, a perforated cover for the outer annular compartment, an imperforate cover having its outer edge provided with a series of cut out sections or notches superimposed over the top of the central compartment and the perforated cover of the annular compartment, a woven asbestos circular cover having an upturned outer flange and superimposed and resting on said imperforate cover, and a split ring for holding said asbestos cover on the imperforate cover and against the inner side of the receptacle.

4. A combined water purifier and sterilizer comprising a receptacle having a bottom with a drain opening flush with said bottom, a drain pipe outside of said receptacle adajacent to the bottom and connected with said drain opening, a screen within the receptacle and over the said opening, a perforated annular ring or partition resting on the bottom of said receptacle and around the opening, thereby dividing the bottom section of said receptacle in a central circular compartment surrounded by an outer annular compartment adapted to receive water purifying material, a cover for the central compartment, a perforated cover for the outer annular compartment, an imperforate cover having its outer edge provided with a series of cut out sections or notches superimposed over the top of the central compartment and the perforated cover of the annular compartment, a woven asbestos circular cover superimposed and resting on said imperforate cover, and means for holding said asbestos, imperforate, and perforate covers on top of said compartments.

5. A combined water purifier, softener, and sterilizer comprising a receptacle having a bottom with a drain opening in said bottom, a drain pipe outside of said receptacle and connected with said drain opening, a screen over the said opening, a perforated partition resting on the bottom of said receptacle and disposed around the opening, thereby dividing the bottom section of said receptacle in a central compartment surrounded by an outer compartment adapted to receive water purifying material, a perforated cover for the outer compartment, an imperforate cover having near its outer edge a series of openings and superimposed over the top of the central compartment and the perforated cover of the outer compartment, and a woven cloth cover superimposed and resting on said imperforate cover.

In testimony whereof I affix my signature in presence of two witnesses.

URBANE J. EWING.

Witnesses:
J. D. SPRINGER,
OLIVE RAYMOND.

Copies of this patent may be obtained for five cents each, by addressing the "Commissioner of Patents, Washington, D. C."